United States Patent
Muthyala et al.

(10) Patent No.: US 9,575,974 B2
(45) Date of Patent: Feb. 21, 2017

(54) DISTRIBUTED FILE SYSTEM GATEWAY

(71) Applicant: NetApp, Inc., Sunnyvale, CA (US)

(72) Inventors: Kartheek Muthyala, Bangalore (IN); Gaurav Makkar, Bangalore (IN); Arun Suresh, Bangalore (IN); Srinivasan Narayanamurthy, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 201 days.

(21) Appl. No.: 14/137,706

(22) Filed: Dec. 20, 2013

(65) Prior Publication Data

US 2015/0113010 A1    Apr. 23, 2015

Related U.S. Application Data

(63) Continuation-in-part of application No. 14/061,596, filed on Oct. 23, 2013, now Pat. No. 9,507,800.

(51) Int. Cl.
*G06F 17/30* (2006.01)
(52) U.S. Cl.
CPC ... *G06F 17/30076* (2013.01); *G06F 17/30194* (2013.01); *G06F 17/30094* (2013.01); *G06F 17/30182* (2013.01); *G06F 17/30227* (2013.01)
(58) Field of Classification Search
CPC .............. G06F 17/30067; G06F 17/30194; G06F 17/30203; G06F 17/30156; G06F 17/30132; G06F 3/0613; G06F 11/2094; G06F 17/30182; G06F 17/30094; G06F 17/30227; H04L 41/5041
USPC ....... 707/758, 621, 692, 694, 822, 825, 827; 711/114, 158
See application file for complete search history.

(56) References Cited

U.S. PATENT DOCUMENTS

| | | | | | |
|---|---|---|---|---|---|
| 5,893,920 | A | * | 4/1999 | Shaheen | G06F 12/0813 707/E17.01 |
| 6,032,227 | A | * | 2/2000 | Shaheen | G06F 12/0813 707/999.202 |
| 6,119,151 | A | * | 9/2000 | Cantrell | G06F 17/30132 707/E17.01 |
| 6,484,177 | B1 | | 11/2002 | Van Huben et al. | |
| 6,625,604 | B2 | * | 9/2003 | Muntz | G06F 17/30067 |
| 7,120,654 | B2 | * | 10/2006 | Bromley | G06F 11/2066 |
| 7,143,146 | B2 | * | 11/2006 | Nakatani | G06F 17/30067 707/E17.01 |

(Continued)

FOREIGN PATENT DOCUMENTS

| | | | | |
|---|---|---|---|---|
| WO | WO 2008029146 A1 | * | 3/2008 | ....... G06F 17/30194 |
| WO | 2009005577 A2 | | 1/2009 | |

OTHER PUBLICATIONS

International Search Report and Written Opinion in International Application No. PCT/US2014/062012 mailed Jan. 26, 2015.

(Continued)

*Primary Examiner* — Frantz Coby
(74) *Attorney, Agent, or Firm* — Klein, O'Neill & Singh, LLP

(57) ABSTRACT

Technology is disclosed for managing data in a distributed file system ("the technology"). The technology can gather metadata information associated with the data stored within a first file system, store the metadata information in association with a data identifier within a second file system, retrieve the stored metadata information using the data identifier from within the second file system and locate and retrieve the data associated with the metadata information from within first file system.

20 Claims, 10 Drawing Sheets

(56) References Cited

U.S. PATENT DOCUMENTS

| | | | | |
|---|---|---|---|---|
| 8,078,575 B2* | 12/2011 | Mehta | ................ | G06F 11/2094 707/609 |
| 8,380,666 B2* | 2/2013 | Ejiri | ................ | G06F 17/30123 707/621 |
| 8,539,174 B2* | 9/2013 | Hahn | .................... | G06F 3/0613 710/13 |
| 8,788,455 B2* | 7/2014 | Mehta | ................ | G06F 11/2094 707/609 |
| 8,990,954 B2* | 3/2015 | Cook | ................ | G06F 17/30171 713/164 |
| 9,092,451 B1* | 7/2015 | Djam | ................ | G06F 17/30203 |
| 9,189,495 B1* | 11/2015 | Hughes | ............. | G06F 17/30194 |
| 2005/0033749 A1 | 2/2005 | M'Zoughi et al. | | |
| 2007/0073990 A1 | 3/2007 | Snaman, Jr. et al. | | |
| 2009/0077327 A1 | 3/2009 | Hara | | |
| 2009/0307329 A1* | 12/2009 | Olston | .............. | G06F 17/30212 709/214 |
| 2011/0295949 A1 | 12/2011 | Calsyn et al. | | |
| 2011/0313973 A1* | 12/2011 | Srivas | ................ | G06F 17/30194 707/634 |
| 2012/0131275 A1* | 5/2012 | Huang | ................ | G06F 11/2094 711/114 |
| 2012/0254215 A1* | 10/2012 | Miyata | .............. | G06F 17/30194 707/758 |
| 2013/0110778 A1 | 5/2013 | Taylor et al. | | |
| 2014/0188819 A1 | 7/2014 | Bagal et al. | | |
| 2014/0195632 A1 | 7/2014 | Hunter et al. | | |
| 2014/0281247 A1 | 9/2014 | Loaiza et al. | | |
| 2015/0106345 A1* | 4/2015 | Trimble | ............ | G06F 17/30156 707/692 |
| 2015/0106420 A1* | 4/2015 | Warfield | ............. | H04L 41/5041 709/201 |
| 2015/0106578 A1* | 4/2015 | Warfield | ................ | G06F 3/0613 711/158 |
| 2015/0112951 A1 | 4/2015 | Narayanamurthy et al. | | |

OTHER PUBLICATIONS

Co-pending U.S. Appl. No. 14/061,596, filed Oct. 23, 2013.
Notice of Allowance on co-pending U.S. Appl. No. 14/061,596 mailed Oct. 4, 2016.
Leveraging EMC Fast Cache with Oracle OLTP Database Applications, Oct. 2010, pp. 1, 6-8.
Non-Final Office Action on co-pending U.S. Appl. No. 14/061,596 dated Dec. 31, 2015.
Final Office Action on co-pending U.S. Appl. No. 14/061,596 dated Jul. 7, 2016.

* cited by examiner

DISTRIBUTED FILE SYSTEM GATEWAY

CROSS-REFERENCE TO RELATED APPLICATION

This application is a continuation-in-part of U.S. patent application Ser. No. 14/061,596, filed Oct. 23, 2013, entitled "DATA MANAGEMENT IN DISTRIBUTED FILE SYSTEMS," which is incorporated herein by reference for all purposes in its entirety.

TECHNICAL FIELD

Various of the disclosed embodiments relate to data management in distributed file systems.

BACKGROUND

Distributed data processing systems may be used to process and analyze large datasets. One such framework used to efficiently process and analyze large datasets is Hadoop, which provides data storage services to clients using a Hadoop Distributed File System (HDFS) and data processing services though a cluster of commodity computers or nodes. The HDFS executes on the cluster of computers (also called as compute nodes or processing nodes) to enable client access to the data in the form of logical constructs organized as blocks, e.g., HDFS blocks. The compute nodes operate mostly independently, to achieve or provide results toward a common goal.

In many enterprise data networks, a mix of different distributed file systems are being used to manage the data stored within the networks. For instance, many enterprise data networks use Network File System (NFS) to provide data storage services to clients while using HDFS with Hadoop to provide data processing services for the stored data. In such networks, to perform data analytics on the stored data using Hadoop, a new HDFS cluster needs to be created by copying (or moving) data stored within NFS into the new HDFS cluster. The newly created HDFS cluster requires not only dedicated infrastructure (e.g., compute nodes, storage devices, etc.), but also explicit copy management to ensure all the copies of a given data within the network remain same. Further, in such networks, any data analytics on the data stored within NFS can only be performed after the copying (or moving) completes and the data is fully available at the new HDFS cluster.

Thus, prior distributed file systems lack efficient data management techniques. There exists a need for efficient data management techniques that addresses at least some of the issues raised above.

DETAILED DESCRIPTION

Technology is disclosed for managing data in a distributed processing environment ("the technology"). The technology reduces the infrastructure and time required to copy (or move) data between different distributed file systems in the distributed processing environment. The technology facilitates this process by gathering metadata information associated with the data stored within a secondary distributed file system, storing the metadata information in association with a data identifier within a primary distributed file system, and indicating a completion of data transfer between the different distributed file systems.

Upon receiving a request by the primary distributed file system for the copied data, the technology facilitates retrieving the stored metadata information from within the primary distributed file system using the data identifier associated with the copied data, locating and retrieving the data associated with the metadata information from within secondary distributed file system, and providing the retrieved data to the requesting entity. In various embodiments, the retrieved data is further stored within the primary distributed file system, allowing the primary distributed file system to use its stored copy to respond to future data access requests. Thus, by fetching and storing only the requested data, the technology ensures that the space on the primary distributed file system is managed efficiently.

Figure 1:
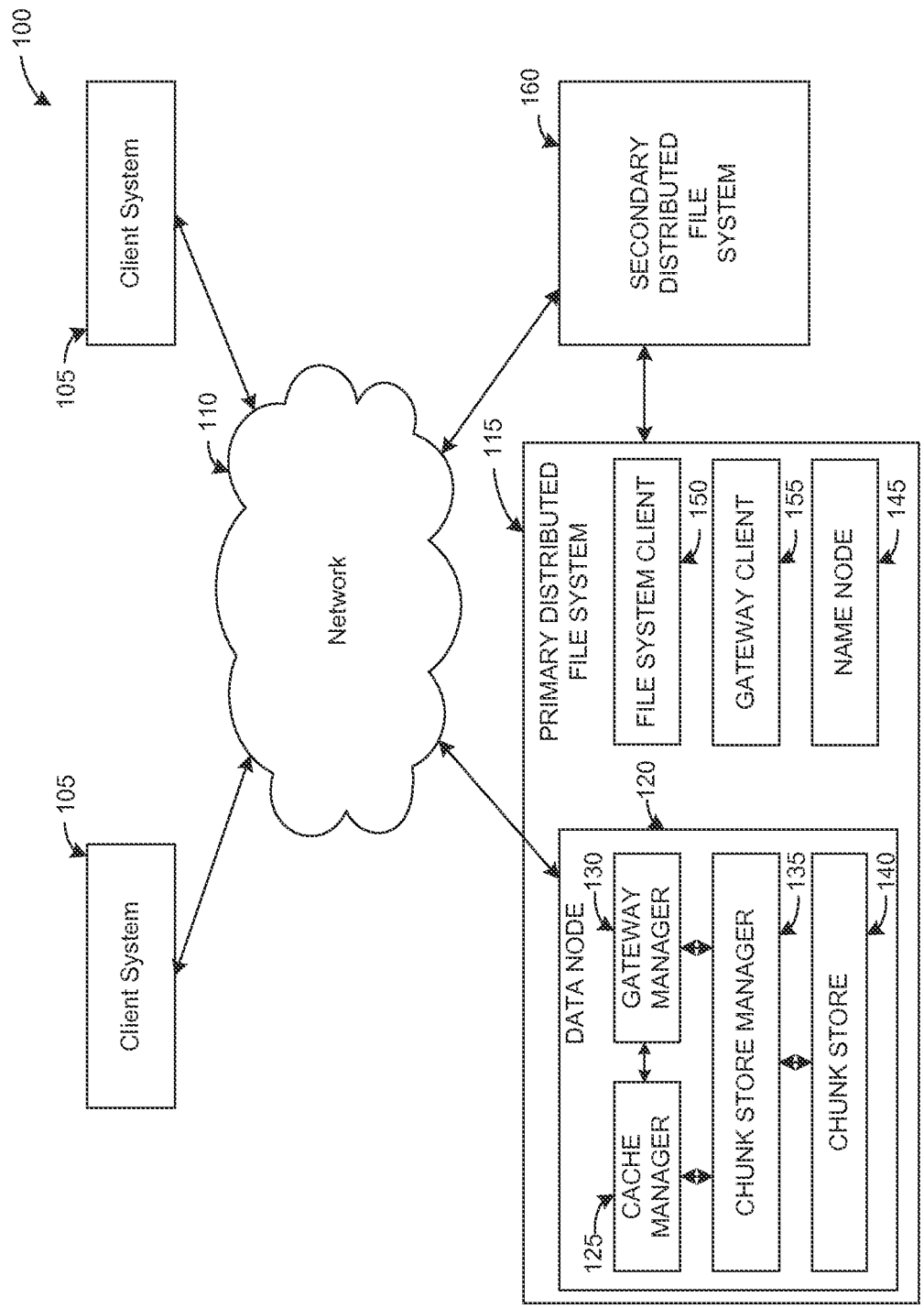
FIG. 1 is a block diagram illustrating a distributed processing environment in which the technology can operate in various embodiments.

Several embodiments of the described technology are described in more detail in reference to the Figures. Turning now to Figures, FIG. 1 is a block diagram illustrating a distributed processing environment 100 in which the technology can operate in various embodiments. The distributed processing environment 100 includes several client systems 105, a primary distributed file system 115 (where a distributed file system is also simply referred to as a file system), a secondary distributed file system 160, and a network 110 connecting the client systems 105 and the distributed file systems 115, 160. As illustrated in FIG. 1, the primary distributed file system 115 ("primary DFS") includes a data node server 120 that stores data received from the client systems 105 and facilitates read/write access to the stored data; and a name node server 145 that manages the namespace of the file system of the primary DFS 115.

The primary DFS 115 further includes a file system client 150 that provides an interface for the client system 105 to access the primary DFS 115; and a gateway client 155 that interfaces between the file system client 150 and the secondary DFS 160 to facilitate copying of data stored in the secondary DFS 160 to the primary DFS 115. In some embodiments, the gateway client 155 facilitates data copying by collecting metadata information associated with the data stored in the secondary DFS 160 by scanning the file system namespace of the secondary DFS 160 and providing the collected metadata information in a form understandable to the file system client 150. The functionalities of the gateway client 155 is described in greater detail with reference to FIGS. 2-4.

Further, the distributed processing environment 100 includes the secondary DFS 160 that stores a set of data received from the client systems 105. The secondary DFS 160 can be a remote storage system that can be connected to the primary DFS 115 over NFS, Hypertext Transfer Protocol (HTTP), or another proprietary access protocol. The secondary DFS 160 can be a storage system of various types, e.g., NFS, Network attached storage (NAS), Redundant Array of Independent Nodes (RAIN), a "$/GB" storage, or any other storage type from a third party. It should be noted that both the primary DFS 115 and the secondary DFS 160 allow the client systems 105 to store and manage their data and that the modifiers "primary" and "secondary" do not imply any client systems' 105 preference in DFS 115, 160 when storing their data. The "primary" designation and "secondary" designation, used in conjunction with the DFSs, are used for the purpose of drawing a distinction between the DFS 115 used by the client systems 105 to access data through and the DFS 160 the client systems 105 used to store the data within, respectively.

In some embodiments, the primary DFS 115 can be a Hadoop Distributed File System (HDFS). The file system client 150 can be a HDFS client and the blocks of data received through the file system client 150 can be HDFS data blocks. For simplicity of discussion, the primary DFS 115 is considered to be HDFS, the file system client 150 to be HDFS clients, and the blocks of data received from and transmitted to the client systems 105 to be HDFS data blocks. However, it should be noted that the embodiments are not restricted to HDFS. In some embodiments, the secondary DFS 160 can be a Native File System (NFS), where data is stored as one or more data files. For simplicity of discussion, the secondary DFS 160 is considered to be NFS and the data received from and transmitted to the client systems 105 are in the form of data files. However, it should be noted that the embodiments are not restricted to NFS.

The data node 120 coordinates functions relating to managing data stored in the HDFS 115. This coordination function may include servicing a read/write request from the client systems 105. In FIG. 1, the data node 120 is illustrated as a standalone element. However, the data node 120 can be implemented as a separate computing device or in a device which performs other functions. The data node 120 includes a gateway manager 130 that monitors the data being stored and accessed on the data node 120. When metadata information is received from the gateway client 155, the gateway manager 130 stores the metadata information in the chunkstore 140, where the metadata information is stored in association with corresponding blocks IDs of one or more data blocks. The block IDs stored in association with the metadata information are those of data blocks in the data node 120 in which the data associated with the metadata information from NFS 160 are to be stored in.

In some embodiments, the gateway client 155 works in coordination with a cache manager 125 to mark as evicted the block IDs of data blocks that have metadata information, gathered from NFS 160, stored in the chunkstore 140 while the data associated with the metadata information is stored in NFS 160. Further, when an access request for a data block is received from the client system 105, the gateway manager 130 checks if the block IDs of the requested data blocks are marked as evicted. If the requested data blocks are marked as evicted, the gateway manager 130 retrieves the metadata information stored in association with the block IDs of the requested data blocks from the chunkstore 140 and generates data requests from the NFS 160 based on the retrieved metadata information. When the data node 120 receives the requested data from the NFS 160, the gateway manager 130 gathers the received data and provides the client system 105 with the requested access to the received data.

In some embodiments, the gateway manager 130 stores the received data in the corresponding data blocks in HDFS 115. Further, the gateway manager 130 works in coordination with the cache manager 125 to mark as not evicted the block IDs of data blocks the received data was stored in. The functionalities of the gateway manager 155 is described in greater detail with reference to FIGS. 2-4. The cache manager 125 in the data node 120 facilitates storing the blocks of data received from the client systems 105 as chunks in the chunkstore 140. In some embodiments, the chunkstore 140 stores the data as "chunks." A chunk of data is, for example, of smaller size compared to the size of a block of data received from the client. In HDFS 115, the HDFS data blocks received from the client systems 105 can typically be in the order of Gigabytes (GB). However, a chunk, in some embodiments, is typically in the order of Megabytes (MB), for example, four (4) MB. In some embodiments, a chunk is a unit of storage within the chunkstore 140. A chunk manager 135 in the data node 120 converts a block of data into chunks of data and stores the chunks in the chunkstore 140. However, the client systems 105 are agnostic of the conversion between HDFS blocks and the chunks. The client systems 105 provide data to and receive data from the distributed file system 115 as HDFS blocks.

The chunkstore 140 can include various storage devices, e.g., disks, flash memory, solid-state drives (SSDs), tape storage, E-series storage system products available from NetApp®, Inc etc. Further, the chunkstore 140 can be implemented in a RAID configuration to improve reliability, availability, performance and/or capacity. The NFS 160 can also include various storage devices, e.g., disks, flash memory, solid-state drives (SSDs), tape storage.

Figure 2:
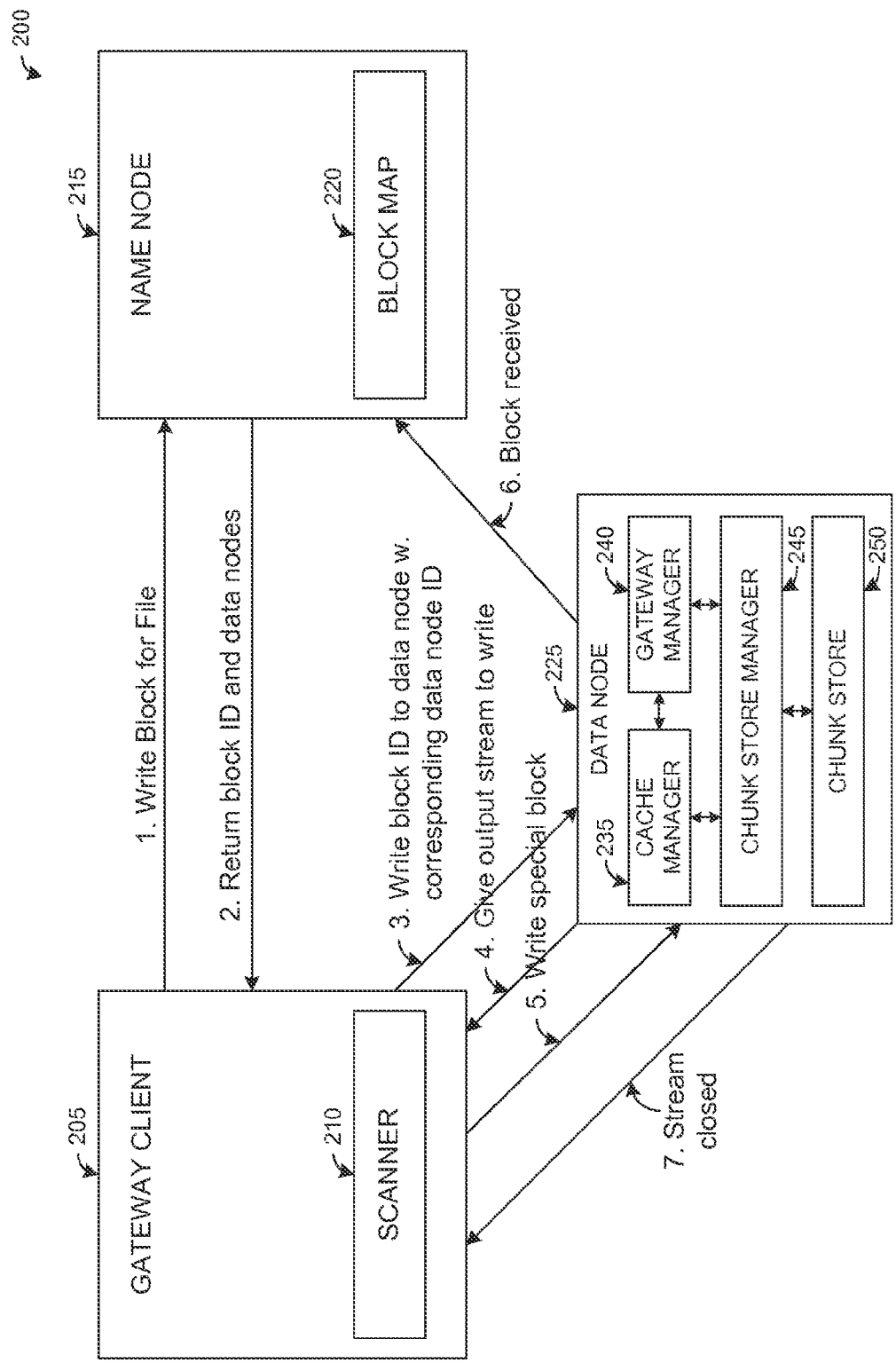
FIG. 2 is a block diagram illustrating writing data from one distributed file system into another distributed file system in the distributed processing environment, consistent with various embodiments.

Turning now to FIG. 2, FIG. 2 is a block diagram illustrating a method for ingesting/writing data files from the NFS 160 into the data node 225 of the HDFS 115 in the distributed processing environment 200, consistent with various embodiments. In some embodiments, the gateway client 205 can be similar to the gateway client 155 of FIG. 1, the data node 225 can be similar to the data node 120 of FIG. 1, and the name node 215 can be similar to the name node 145 of FIG. 1. The gateway client 205 intends to facilitate copying of data from one distributed file system, e.g., NFS 160 of FIG. 1, to another distributed file system, e.g., HDFS 115 of FIG. 1, in the distributed processing environment 200. In some embodiments, the gateway client 205 could be initiated to facilitate copying of one or more data files by a client system, e.g., client systems 105 of FIG. 1, intending to analyze the data stored within the NFS 160 using the HDFS 115. In some embodiments, the gateway client 205 could be initiated to facilitate copying of one or more data files by a user intending to analyze the data stored within the NFS 160 using the HDFS 115.

The gateway client 205 utilizes a scanner 210 to scan the namespace of NFS 160 and generate a metafile containing the metadata information associated with the data files being copied from NFS 160 to HDFS 115. In some embodiments, in the metafile, the gateway client 205 groups the metadata information associated with the data files into one or more records, where each record corresponds to a data block in HDFS 115. In some embodiments, the total size of the data files included in a record is approximately equal to the size of a data block in HDFS 115. For example, if the HDFS 115 is configured to handle data blocks of size 1 GB, the gateway client 205 groups the metadata information of one or more copied data files such that the total size of the data files corresponding to the metadata information is approximately equal to 1 gigabyte (GB).

Figure 3A:
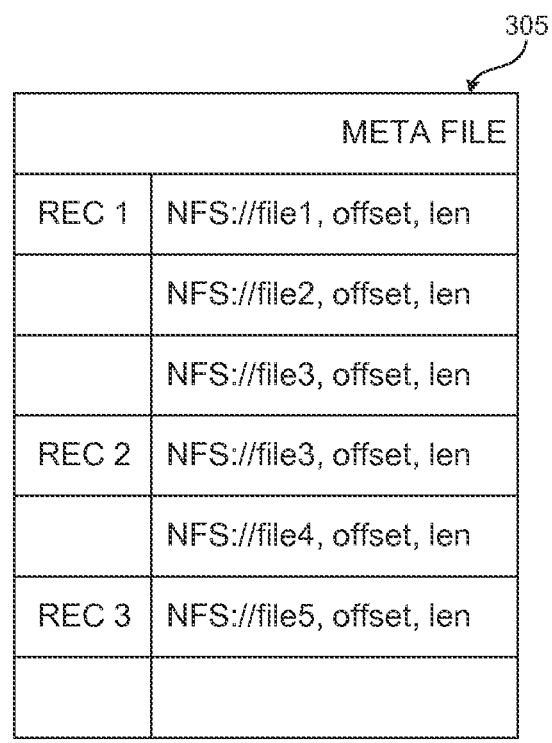
FIG. 3A illustrates an example of a metafile generated by a scanner module within the distributed processing environment, consistent with various embodiments.

Turning briefly to FIG. 3A, FIG. 3A illustrates an example of a metafile generated by scanner 210, where a sequence of multiple records, each corresponding to a HDFS 115 data block in size, are created for the data files "file1" through "file5" being copied from NFS 160 to HDFS 115. Each record contains the metadata information of the files being copied, for e.g., the pathname of the files, the portion of the file corresponding to the record, etc. For example, in FIG. 3A, the "Rec1" and "Rec2" each contain a portion of the data file "file3", where the portion of the data file corresponding to each record is indicated by an offset from which to start copying and the length of data to copy from the offset. In some embodiments, the metadata information can also be interpreted, used, understood, or decoded by the NFS 160. In various embodiments, the metadata information can be part of metadata of the data files stored in NFS 160. In some embodiments, the metadata information enables NFS 160 to locate and read the requested data files, as described with reference to FIG. 4.

Returning now to FIG. 2, in some embodiments, the gateway client 205, working in coordination with the HDFS client (not shown in FIG. 2), similar to the HDFS client 150 of FIG. 1, requests the name node 215 to allocate one or more data blocks to store the data from the data files being copied from NFS 160 to HDFS 115. In some embodiments, the HDFS client 150 utilizes an API from the Hadoop API library to request the name node 215 for allocation of the one or more data blocks. In some embodiments, the HDFS client 150 utilizes the DFSOuputStream API from the Hadoop API library to request the name node 215 to allocate the one or more data blocks for storing the data being copied from NFS 160 to HDFS 115.

The DFSOutputStream API allows the HDFS client 150 to cache the data being written to HDFS 115 into a temporary local file. The DFSOutputStream API transparently redirects the data being written to a temporary local file. When the local file accumulates data worth at least one HDFS block size, DFSOutputStream API contacts the name node 215 to allocate a block for writing the accumulated data to a data node 225. In some embodiments, the HDFS client 150 utilizes a modified DFSOutputStream API to allocate data blocks based on the metadata information of the data being copied from NFS 160 to HDFS 115.

In some embodiments, the DFSOutputStream API utilizes the metadata information, gathered by the scanner 210, corresponding to the data being copied from NFS 160 to HDFS 115 to determine the size of the data being copied. The DFSOutputStream API utilizes the determined size to request the name node 215 to allocate one or more data blocks for storing the data being copied from NFS 160 to HDFS 115. The DFSOutputStream API does not require the data to be copied and cached by the HDFS client 150 before requesting the name node 215 to allocate the data blocks for storing the data being copied.

In some embodiments, in response to data block allocation request, the name node 215 utilizes a block map 220 to identify the data node 225 and the data blocks within the data node 225 to allocate for storing the data from the copied data files. The block map 220 maintains a list of data nodes within the distributed processing environment 200 and the data blocks within each of the data nodes with their status information indicating whether the block is allocated or not.

In some embodiments, the identified data node 225 is provided to the gateway client as a data node identification number ("data node ID") and the data blocks determined within the data node 225 is provided to the gateway client 205 as a block identification number ("block ID"). In some embodiments, the name node maintains a mapping between the names of the files being stored in the allocated data blocks, allowing client systems 105 to retrieve the data associated with the stored files from HDFS 115 using the names of the stored files.

In some embodiments, the gateway client 205, working in coordination with the HDFS client, sends a write request along with the received block ID to the data node 225 associated with the received data node ID. In some embodiments, the data node 225, upon receiving the write request and the block ID, generates and provides an output stream to the gateway client 205 to allow the gateway client 205 to copy the data to be stored within the data block corresponding to the block ID.

In some embodiments, the gateway client 205, upon receiving the output stream, gathers metadata information corresponding to one of the records in the metafile generated by the scanner 210 and writes the metadata information to the output stream. In some embodiments, the gateway client 205 includes a delineator prefix, e.g., "special data block", to indicate to the data node 225 that a "special" data block is being written and that the data being written to the output stream contains metadata information not intended to be stored as data within the data block (associated with the block ID).

In some embodiments, the gateway manager 240 analyzes the data being written to the output stream to determine if a "special" data block is being written. In some embodiments, the gateway manager 240 parses the data being written to the output stream for delineators, e.g., "special data block", to determine that a "special" data block is being written and that the data being written to the output stream contains metadata information not intended to be stored as data within the data block (associated with the block ID).

Figure 3B:
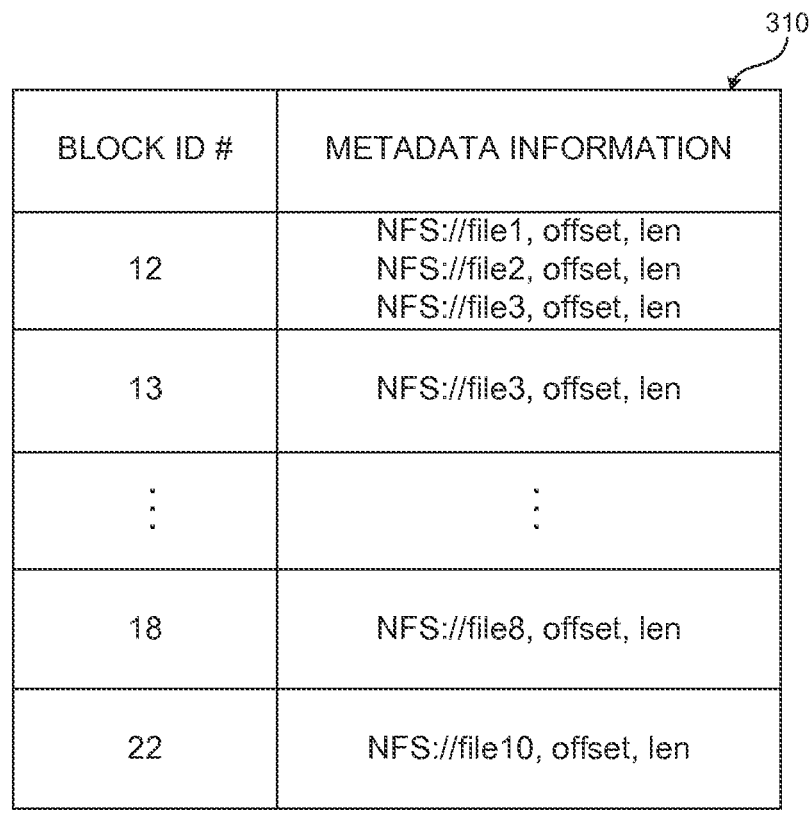
FIG. 3B illustrates an example of a mapping table containing the block ID of a data block and the corresponding metadata information associated with the data to be stored in the data block within the distributed file environment, consistent with various embodiments.

In some embodiments, when the gateway manager 240 detects a "special" data block, the gate manager 240 stores the metadata information, written to the output stream, in a mapping table along with the corresponding block ID of the data block associated with the output stream. Turning briefly to FIG. 3B, FIG. 3B illustrates an example of a mapping table containing the block ID and the corresponding metadata information associated with the data being stored in the data block with the block ID.

Returning now to FIG. 2, in some embodiments, the gateway manager 240, working in coordination with the chunkstore manager 245, stores and manages the mapping table in the chunkstore 250. In some embodiments, the gateway manager 240, working in coordination with the cache manager 235, stores an indicator in conjunction with the block ID of the data block that received the metadata information to indicate that the data block has been evicted from the data node 225. In some embodiments, the gateway manager 240 utilizes the indicator to determine which data blocks contain their associated data within HDFS 115 and which ones do not.

When a "special" data block is detected, in some embodiments, the gateway manager 240 prevents the data received through the output stream to be stored within the data block associated with the output stream. After storing the metadata information associated with the "special" data block in the mapping table, in some embodiments, the gateway manager 240 notifies name node 215 that the data to be stored in the data block associated with the block ID has been received.

In some embodiments, the data node 225 utilizes an API from the Hadoop API library to generate and provide an output stream to the gateway client 205, where the gateway client 205 utilizes the output stream to copy the data to the data node 225. In some embodiments, the data node 225 utilizes the FSDataOutputStream API from the Hadoop API library to generate and provide an output stream to the gateway client 205. In some embodiments, the data node 225 utilizes a modified FSDataOutputStream API to determine whether a "special" data block is being written and to write the "special" data block in the chunkstore 250. In some embodiments, the FSDataOutputStream API is further modified to notify the name node 215 that the data has been received after writing the "special" data block associated with the data in the chunkstore 250. In some embodiments, the FSDataOutputStream API utilizes the finalizeBlock API from the Hadoop API library to send the data received notification to the name node 215.

As discussed above, the name node 215 maintains a mapping between the names of the files being stored in the allocated data blocks. In some embodiments, the name node 215 generates the mapping between the names of stored files and allocated data blocks only after receiving a confirmation from the data node 225 that the data to be stored in the allocated data blocks has been received. Once the transfer of metadata information is completed, in some embodiments, the data node 225 closes the output stream. Accordingly, the method for ingesting/writing data files from the NFS 160 into the data node 225 of the HDFS 115 in the distributed processing environment 200 has been described above.

Figure 4:
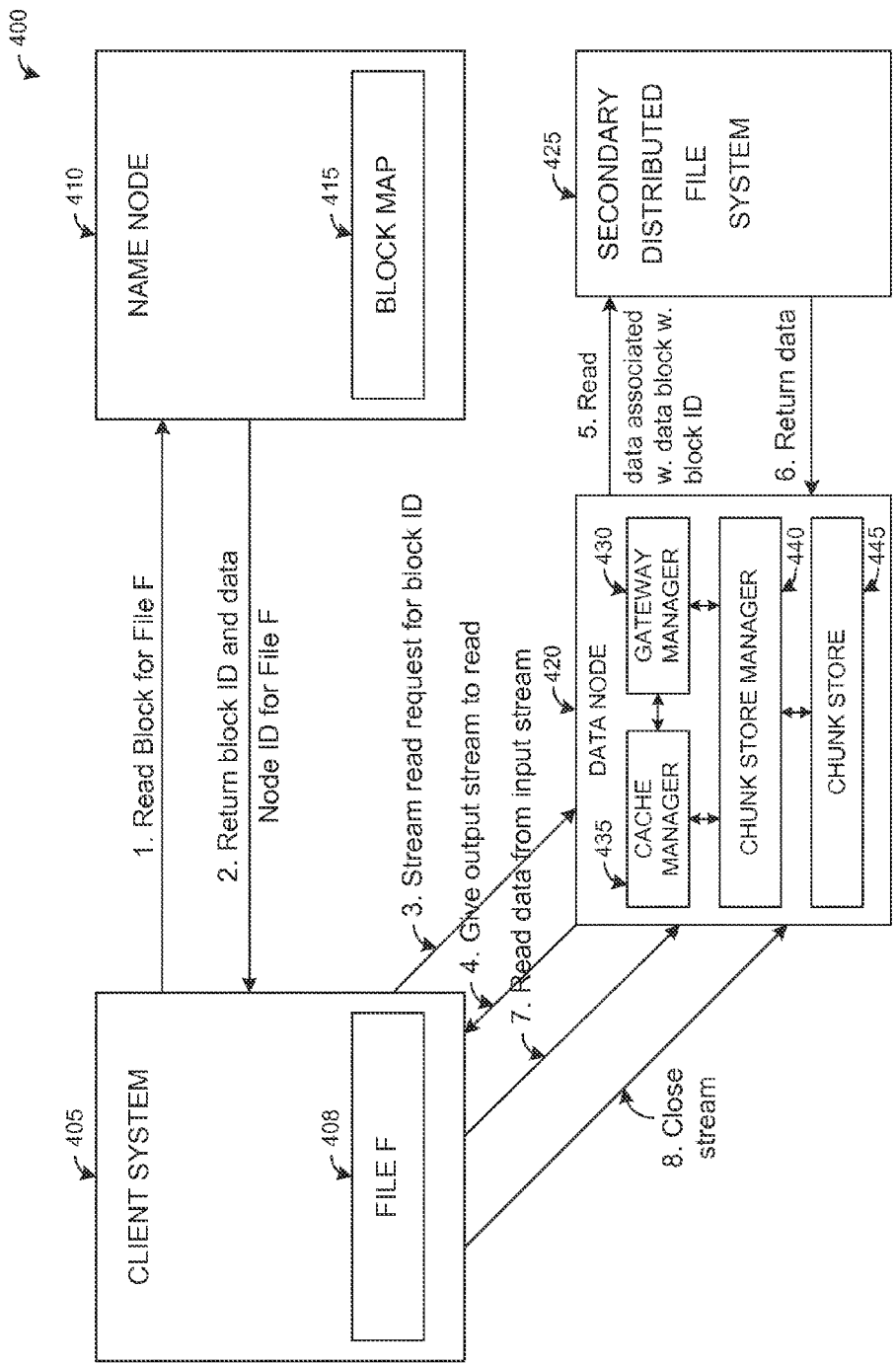
FIG. 4 is a block diagram illustrating accessing data stored within one distributed file system using another distributed file system in the distributed processing environment, consistent with various embodiments.

Turning now to FIG. 4, FIG. 4 is a block diagram illustrating a method for reading data of a data block using metadata information ingested/stored in association with the data block from NFS 160 into the data node 225 of HDFS 115 in the distributed processing environment 200. In some embodiments, the client system 405 can be similar to the client system 105 of FIG. 1, the data node 420 can be similar to the data node 225 of FIG. 2, the name node 410 can be similar to the name node 215 of FIG. 2, and the NFS storage system 425 can be similar to the NFS storage system 160 of FIG. 1.

The client system 405 intends to access (e.g., read) a file's data (e.g., file "F" 408) from the distributed file system, e.g., HDFS 115 of FIG. 1, to which the file's data was copied from another distributed file system, e.g., NFS 160 of FIG. 1, upon a client system's request 405 in the distributed processing environment 200. In some embodiments, the client system 405, working in coordination with the HDFS client (not shown in FIG. 4), similar to the HDFS client 150 of FIG. 1, requests the name node 410 to provide the block IDs of the one or more data blocks allocated to store the data from the data file copied from NFS 160 to HDFS 115.

In some embodiments, in response to request for block IDs allocated for a data file, the name node 410 utilizes the block map 415 to determine the data node 420 and the block IDs of data blocks within the data node 420 allocated for storing the data file and return the determined data node 420 and block IDs to the client system 405. As discussed above, in some embodiments, the name node 410 maintains a mapping between the names of the stored data files and the block IDs of data blocks allocated for storing the data files, allowing the client system 405 to retrieve the block IDs associated with the files stored in HDFS 115 using the names of the stored files.

Upon receiving the requested information, the client system 405, working in coordination with the HDFS client, sends a read request along with the received block ID to the data node 420 associated with a received data node ID. In some embodiments, the data node 420, upon receiving the read request and the block ID, generates and provides an input stream to the client system 405 to allow the client system 405 to read the data from data block corresponding to the block ID. In some embodiments, the gateway manager 430 analyzes the block ID of data block being requested to determine whether the data block associated with block ID has been marked as evicted from HDFS 115.

When the block ID associated with the data block is marked as evicted, in some embodiments, the gateway manager 430 further analyzes the block ID of the requested data block to determine whether the block ID is associated with a "special" data block. In some embodiments, the gateway manager 430 utilizes the mapping table, similar to the mapping table 310 in FIG. 3B, which contains the mapping between block IDs of data blocks and their corresponding metadata information, to determine if a request data block is a "special" data block.

In some embodiments, when the gateway manager 430 detects an access request for an evicted "special" data block, the gate manager 430 gathers the metadata information associated with the "special" data block from the mapping table 310 and generates one or more read request corresponding to each of the data files being read from NFS 425. For example, using the mapping table 310 in FIG. 3B, the gateway manager 430 can gather data for data block with block ID "13". The gateway manager 430 utilizes the pathname, offset and length of NFS 425 data files "file3" and "file4" associated with the requested data block to generate read requests for the data files "file3" and "file4" from NFS 425 using the appropriate communication protocol (e.g., NFS Protocol).

When the gateway manager receives the requested data files from NFS 425, the gateway manager 430 provides the received data files to the client 405 through the input stream. In some embodiments, the gateway manager 430 stores the data from the received data files within the data block associated with the block ID. In some embodiments, the gateway manager 430, working in coordination with the chunkstore manager 440, stores the received data files within the data block in the chunkstore 445. Additional details of how the data block is stored within the chunkstore 445 is described with reference to FIG. 8.

After storing the received data files in the data block within HDFS 115, in some embodiments, the gateway manager 430, working in coordination with the cache manager 435, removes any indicator stored in conjunction with the block ID of the data block that indicates that the data block has been evicted from the data node 420. After storing the received data files in the data block within HDFS 115, in some embodiments, the gateway manager 240 removes any entry associated with the block ID of the data block from the mapping table 310 used to determine if a given data block is a "special" data block.

When the data node 420 receives a data access request for a data block with a block ID that has no entry in the mapping table 310, the data node 420, working in coordination with the chunkstore manager 440, searches the chunkstore 445 of the data node 420 to provide the requested data block. Once the requested data block is read by the client system 405, in some embodiments, the data node 420 closes the input stream, preventing further access to the requested data block by the client system 405. Accordingly, the method for reading data of a data block using metadata information ingested/stored in association with the data block from NFS 160 into the data node 225 of HDFS 115 in the distributed processing environment 200 has been described.

Figure 5:
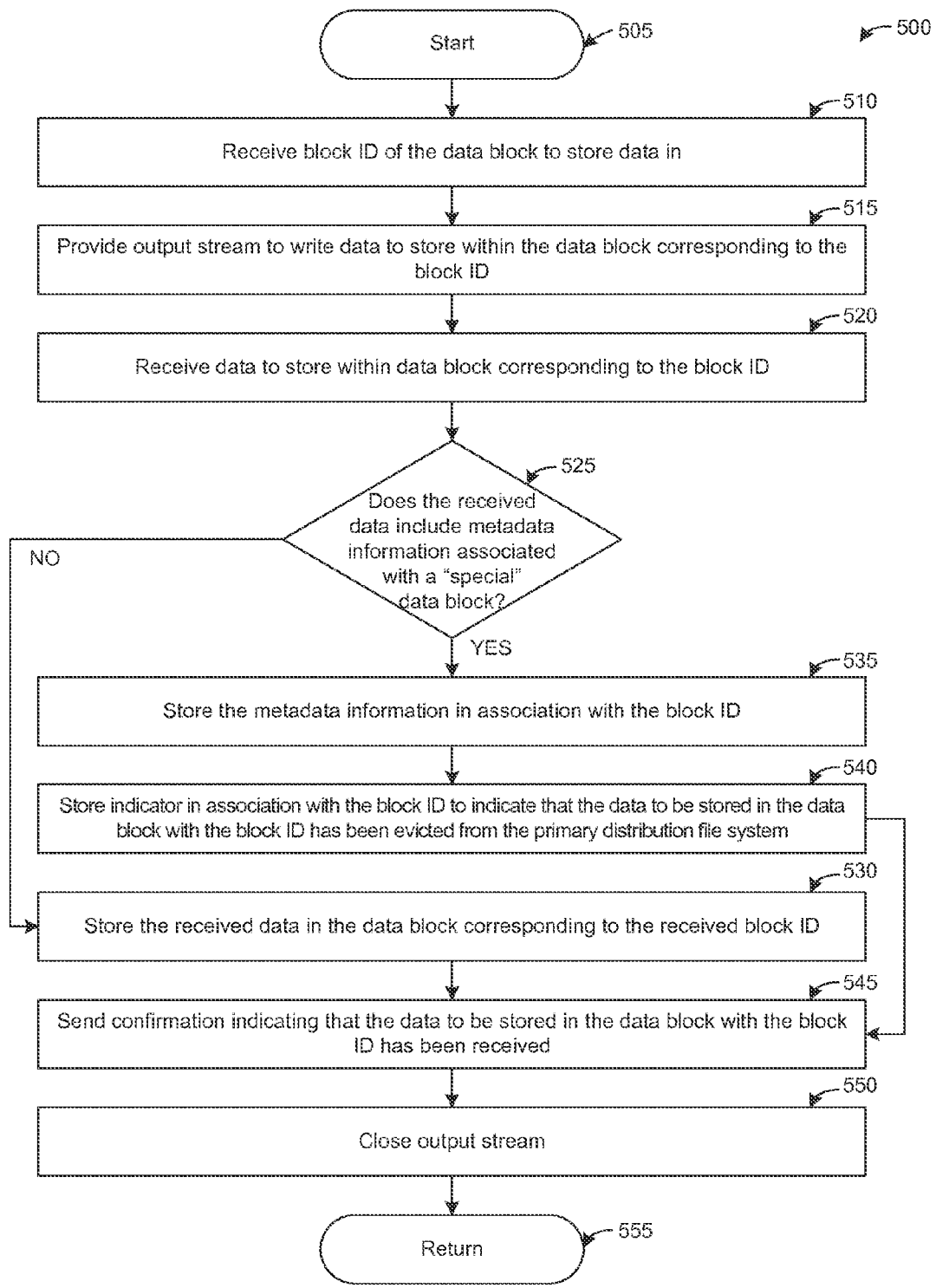
FIG. 5 is a flow diagram illustrating a method for storing "special" data block in a distributed file system, consistent with various embodiments.

FIG. 5 is a flow diagram illustrating a method 500 for storing "special" data block in a primary DSP, consistent with various embodiments. In various embodiments, the method 500 may be executed in a distributed processing environment, e.g., distributed processing environment 100 of FIG. 1. The method 500 starts at block 505. At block 510, a data node of the primary DSP receives a block ID of the data block used to store data in. At block 515, the data node provides an output stream to write the data to be store within the data block corresponding to the received block ID.

At block 520, the data node receives the data to be stored within the data block, corresponding to the received block ID, through the output stream. At decision block 525, the data node determines if the received data includes metadata information associated with a "special" data block. As discussed above with reference to FIGS. 2 and 3, in some embodiments, the data node can determine if the received data is associated with a "special" data block by parsing for delineators, for e.g., string "special data block", included within the received data.

If the received data does not include metadata information associated with a "special" data block, at block 530, the data node stores the received data in the data block corresponding to the received block ID within the primary DFS. On the other hand, if the received data does include metadata information associated with a "special" data block, at block 535, the data node stores the received metadata information in association with the block ID in a mapping table similar to that described with reference to FIG. 3B.

At block 540, the data node stores an indicator in association with the block ID to indicate that the data to be stored in the block ID has been evicted from the primary DFS. At block 545, the data node sends a confirmation to a name node of the primary DFS indicating that the data to be stored within the data block associated with the received block ID has been received. At block 550, the data node closes the output stream. The method returns at block 555.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

Figure 6:
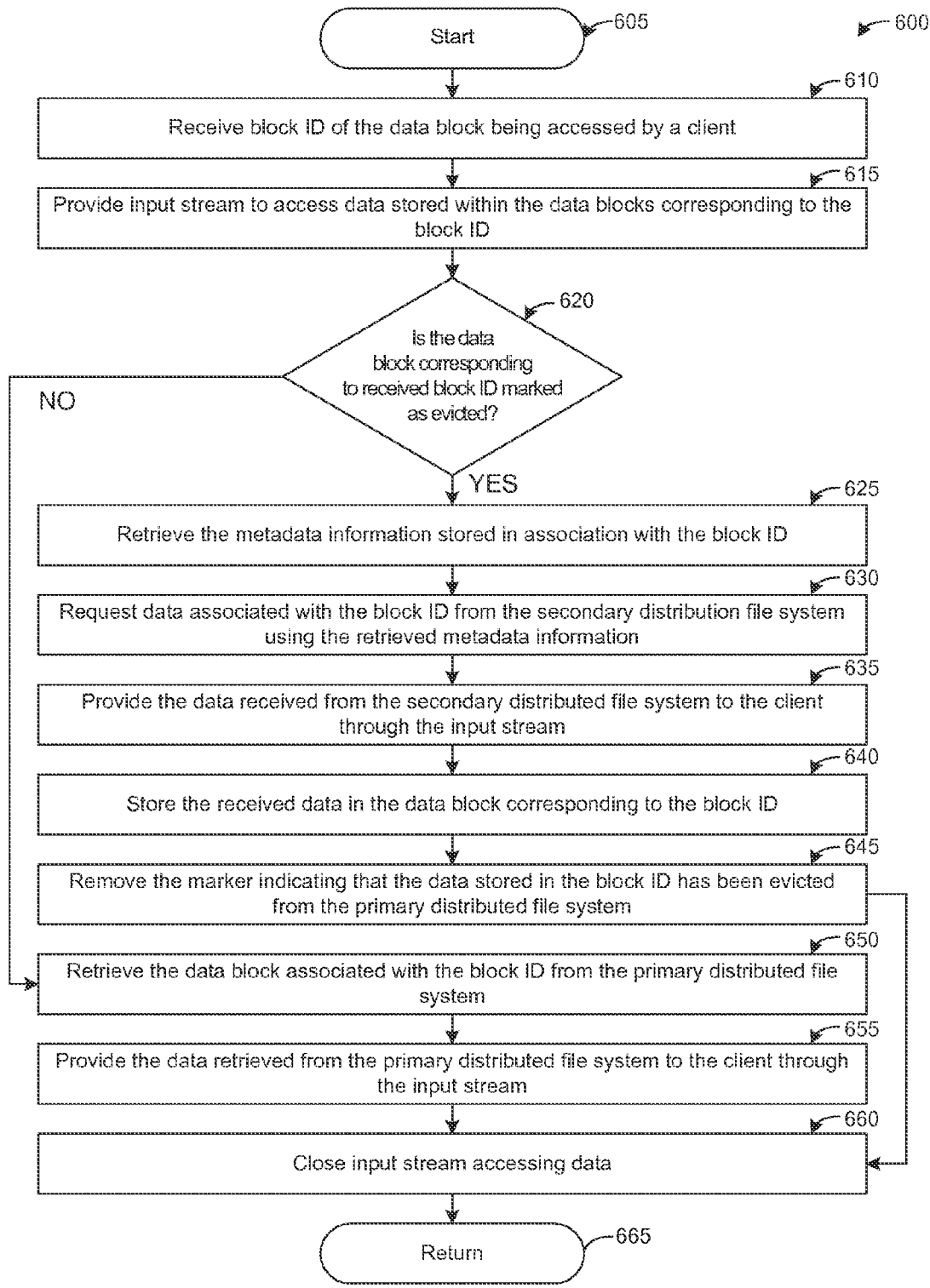
FIG. 6 is a flow diagram illustrating a method for accessing the data of a "special" data block stored in a distributed file system, consistent with various embodiments.

FIG. 6 is a flow diagram illustrating a method 600 for accessing the data of a "special" data block stored in a primary DSP, consistent with various embodiments. In various embodiments, the method 600 may be executed in a distributed processing environment, e.g., distributed processing environment 100 of FIG. 1. The method 600 starts at block 605. At block 610, the data node receives a block ID of the data block being accessed by a client. At block 615, the data node provides the client with an input stream to access the data stored within the data block corresponding to the received block ID.

At decision block 620, the data node determines if the data block corresponding to received block ID is marked as evicted. If the data node determines that the data block corresponding to received block ID is marked as evicted, at block 625, the data node retrieves the metadata information stored in association with the block ID from a mapping table similar to that shown in FIG. 3B. At block 630, using the retrieved metadata information, the data node requests the secondary distributed file system to provide the data associated with the block ID.

At block 635, the data node provides the data received from the secondary distributed file system to the client through the input stream. At block 640, the data node stores the received data in the data block corresponding to the block ID within the primary distributed file system. At block 645, the data node removes any marker indicating that the data associated with the block ID has been evicted from the primary distributed file system.

Referring back to the decision block 620, if the data node determines that the data block corresponding to received block ID is not marked as evicted, at block 650, the data node retrieves the data block associated with the block ID from the primary distributed file system. At block 655, the data node provides the client with the data retrieved from the primary distributed file system through the input stream. At block 660, the data node closes the input stream. The method returns at block 665. The gathering and storing of metadata information used in the methods 500 and 600 is described with reference to FIG. 7 below.

Figure 7:
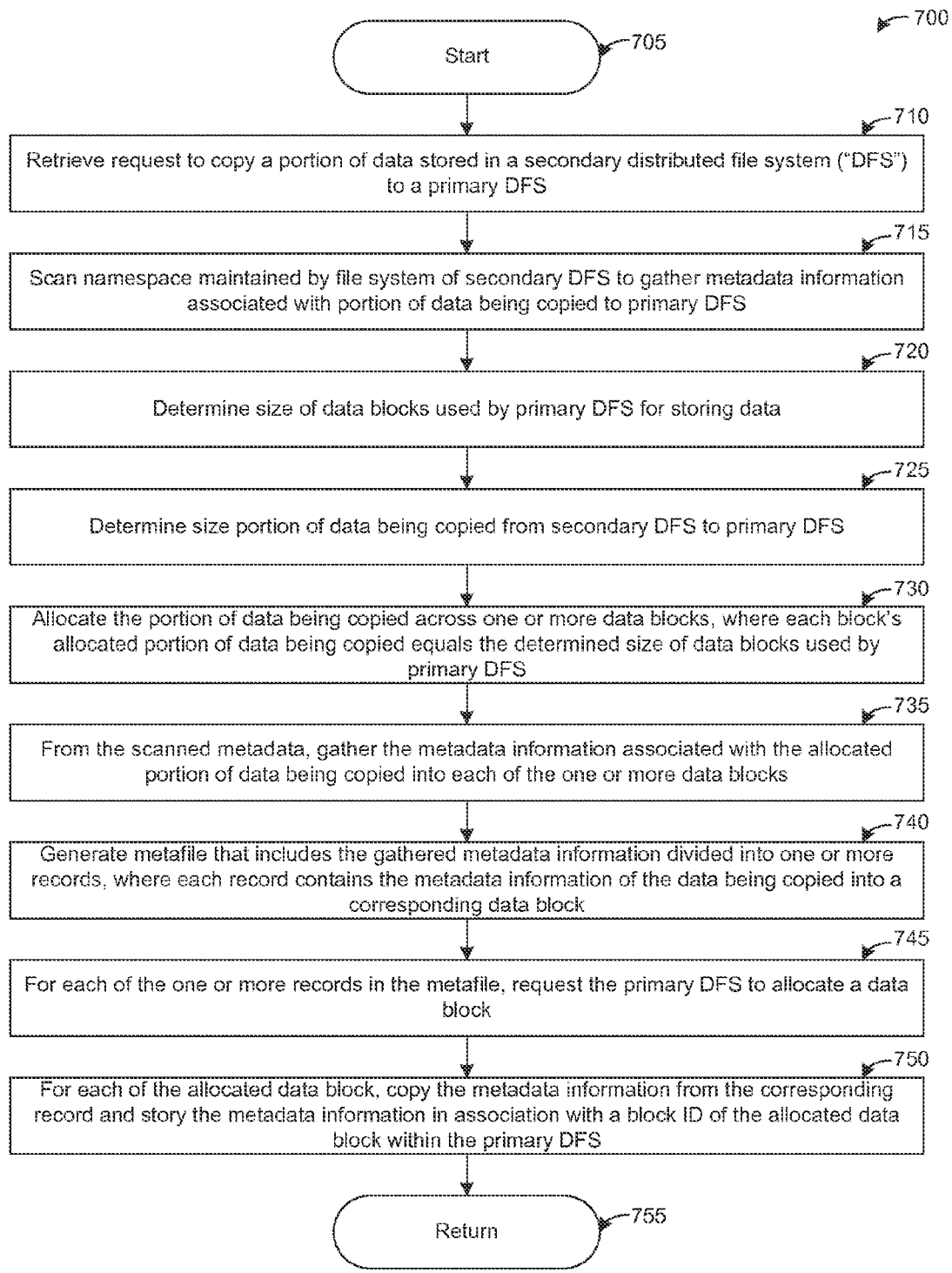
FIG. 7 is a flow diagram illustrating a method for gathering and storing the metadata information used for accessing data stored within one distributed file system using another distributed file system in the distributed processing environment, consistent with various embodiments

FIG. 7 is a flow diagram illustrating a method 700 for gathering and storing the metadata information used in the methods 500 and 600, consistent with various embodiments. In various embodiments, the method 700 may be executed in a distributed processing environment, e.g., distributed processing environment 100 of FIG. 1. The method 700 starts at block 705. At block 710, a gateway client receives a request to copy a portion of data stored in a secondary distributed file system ("DFS") to a primary DFS. At block 715, the gateway client scans the namespace maintained by file system of secondary DFS to gather metadata information associated with portion of data being copied to primary DFS.

At block 720, the gateway client determines the size of data blocks used by primary DFS for storing data. For example, HDFS 115 uses a data block size of 1 GB to store data. At block 725, the gateway client determines the size of portion of data to be copied from secondary DFS to primary DFS. At block 730, the gateway client allocates the portion of data to be copied across one or more data blocks, where each block's allocated portion of data to be copied equals the determined size of data blocks used by primary DFS.

At block 735, using the scanned metadata, the gateway client gathers the metadata information associated with the allocated portion of data to be copied into each of the one or more data blocks. At block 740, the gateway client generates metafile that includes the gathered metadata information divided into one or more records, where each record contains the metadata information of the data being copied into a corresponding data block.

At block 745, for each of the one or more records in the metafile, the gateway client requests the primary DFS to allocate a data block. At block 750, for each of the allocated data blocks, the gateway client copies the metadata information from the corresponding record and stores the metadata information in association with a block ID of the allocated data block within the primary DFS. The method returns at block 755.

Figure 8:
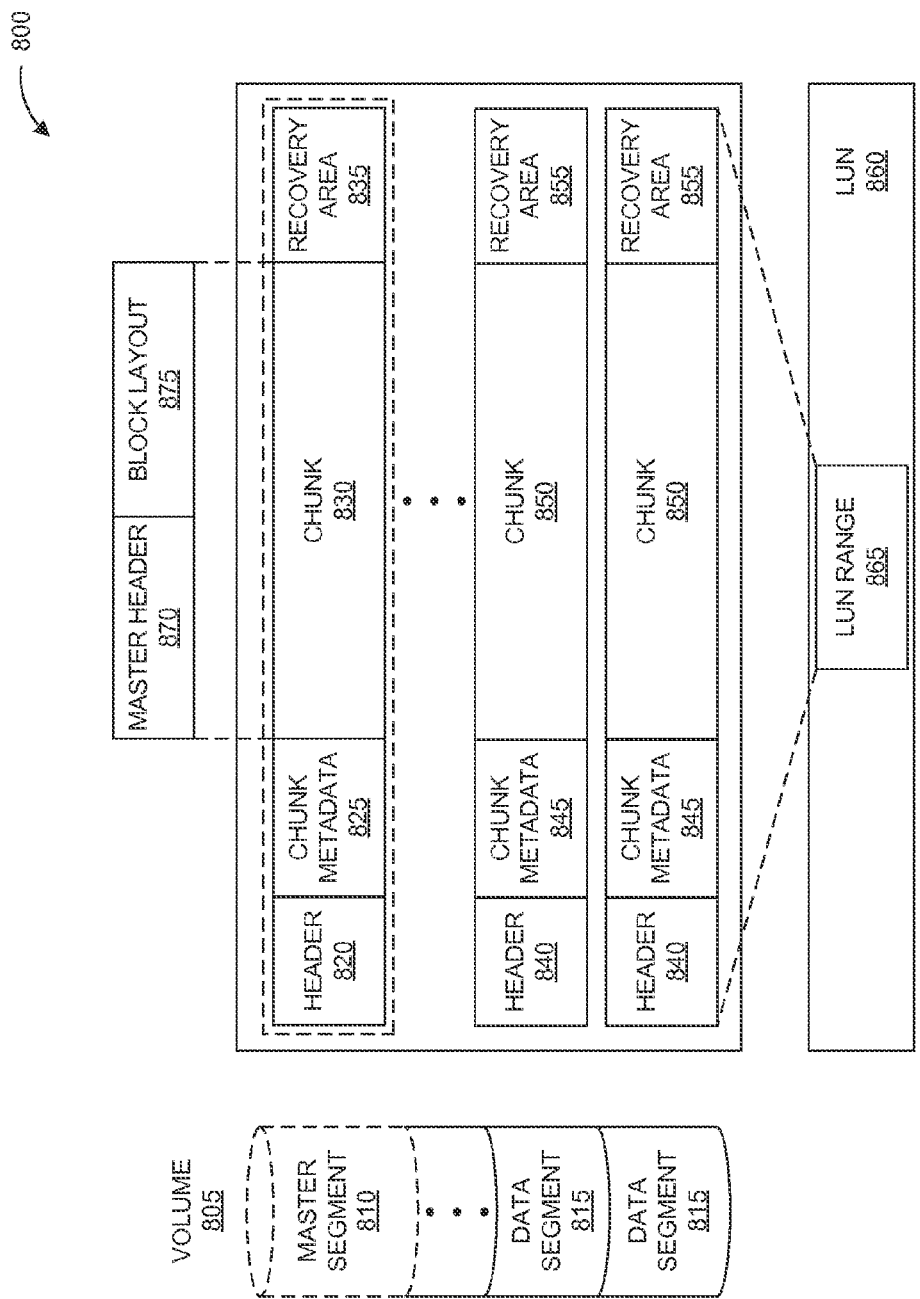
FIG. 8 is a block diagram of an on-disk layout of a chunkstore of a distributed file system, consistent with various embodiments.

FIG. 8 is a block diagram of an on disk layout 800 of a chunkstore 140 of a distributed file system 115 of FIG. 1, consistent with various embodiments. As described with reference to FIG. 1, in some embodiments, the chunkstore 140 can include various storage devices, e.g., disks, flash memory, solid state drives (SSDs), tape storage, E-series storage system products available from NetApp®, Inc etc. For simplicity it is considered that the chunkstore 140 includes disks.

In some embodiments, the on-disk layout 800 of the chunkstore 140 is implemented as multiple volumes 805. A volume comprises a subset of disks of the chunkstore 140, and acts as an individual data container, e.g., chunkstore 140. The volume 805 may include a plurality of segments, wherein one segment is a master segment 810 and the other segments are data segments 815. Each segment may be formed from a range of bytes within a logical unit number (LUN) 860 constructed from one or more disks of the storage devices of chunkstore. In some embodiments, a LUN is a logical representation of storage. The LUN appears like a hard disk to a client. In some embodiments, a LUN appears like a file inside of a volume. A LUN range 865 thus defines a location of a segment within the volume 805. In some embodiments, the LUN range 865 may be a contiguous range of bytes within a LUN 860, although it will be understood to those skilled in the art that the range of bytes need not be contiguous. That is, instead of a physical range of disk space (e.g., disk blocks) constituting LUN 860, a virtual range of disk space could constitute the LUN, wherein the disk blocks of the virtual range of disk space may be written anywhere on disk (e.g., by a write-anywhere file system) and organized as LUN range 865 by, e.g., linking of the blocks throughout the storage array.

Accordingly, the volume 805 may contain multiple LUN ranges 865 for data and master segments of the volume. A segment does not have to be contained within the same LUN 860 to form the volume 805. That is, different segments (i.e., different LUN ranges 865) of different LUNs 860 may be organized as the volume 805. As an example, the volume may constitute four segments formed from two LUNs 860, wherein three of the segments may be formed from a first LUN and one of the segments may be formed from a second LUN. As a result, a size or capacity of the volume may be grown or shrunk quickly and efficiently. For instance, to grow the capacity of the volume, a system administrator need only add more data segments 815 to the volume. The various segments of the various LUNs 860 may then be organized as the volume 805 using identifiers, as discussed further herein.

In some embodiments, each data segment 815 has an on-disk layout organized as several fields, including a header field 840, a chunk metadata field 845, a chunk field 850 and a recovery area field 855. As described above, a chunk is a unit of storage within the on-disk layout of the chunkstore 140. The data segments 815 of volume 805 are provided to allocate, store, retrieve and recover chunks, including their data and metadata. To that end, the header field 840 generally contains information about the data segment, including a size of the segment, a size of the chunk(s) stored within the segment, a storage location of different components/areas of the segment (i.e., the LUN within which the segment is stored) and the volume to which the segment belongs.

Each data segment is associated with other data segments to form the volume using various identifiers contained in the header field 840. One such identifier is a LUN identifier (LUN id) that provides the association of the data segment to a LUN. The LUN ID includes an offset within the LUN and a size of the segment constituting the LUN range. Illustratively, the LUN id is located in the header field 840 of data segment 815 because that LUN id may be different for each segment. Another identifier is a volume identifier (volume id) that, among other things, operates to associate the data segments collectively as volume 805.

The chunks are stored in the chunk field 850 of the data segment 815. As used herein, allocation of a chunk denotes adding a chunk to the chunk field 850 and de allocation of a chunk denotes deleting or removing a chunk from the chunk field 850. Once written and allocated, a chunk may not be modified (written again); it can only be deleted/deallocated. Therefore, a simple chaining of chunks may be all that is needed. To modify its data content, the chunk is deallocated (deleted) and then allocated (written); that is, the chunk is not modified in place. Metadata is provided for managing and tracking the allocation/deallocation of chunks within the chunk field 850 of the data segment 815. The chunk metadata information (i.e., allocation/deallocation information) is stored in the chunk metadata field 845. In some embodiments, chunk metadata is stored in the chunk metadata field 845 for each corresponding chunk stored in the chunk field 850. Each chunk metadata may specify whether the corresponding chunk has been allocated (or deallocated) and, if allocated, to which client or application it has been allocated. Thus, the client that allocated or deallocated the corresponding chunk may be identified by the chunk metadata.

The recovery area field 855 contains recovery information that identifies any change made to the chunk metadata. In some embodiments, the recovery information includes a transaction identifier that uniquely identifies the recovery information, an action (e.g. an allocation or deallocation operation) and a checksum for use in error correction during replay/recovery of checksum-related data. The allocation or deallocation operation, including a change of state, of a chunk in the data segment 815 is written to the recovery area field 855. A change of state of the chunk denotes a change or transition to the chunk metadata of the chunk; the allocation/deallocation of a chunk transitions through certain states, for example, partially allocated, partially filled, not yet finalized, allocated, and deallocated.

In some embodiments, a data segment 815 is not dependent upon (and thus is unaware of the presence of) another data segment within a volume; the data segments of the volume are totally isolated. Accordingly, the data segment 815 may be defined as a fault boundary, which means that if a failure occurs to the segment, the failure is totally contained within the segment. Such a fault boundary eliminates a single recovery area (and single point of failure) for an entire volume. Only the master segment 810 is aware of the presence other data segments 815 in the volume 805.

In some embodiments, the master segment 810 contains information sufficient to organize all of the data segments within the volume. The organization of the volume 805 ensures that each data segment 815 is independent of other data segments and, if a failure occurs on a storage device or LUN range 865 that constitutes the particular data segment, the failure is isolated within that data segment 815. Although this organization advantageously obviates the destruction of the volume in response to a failure of a data segment, the content of the failed data segment can still be recovered using error detection and correction techniques (e.g. RAID) on the storage devices in the chunkstore 140.

In some embodiments, the master segment 810 has an on-disk layout that is generally similar to that of the data segment 815. That is, the master segment 810 is organized as several fields, including a header field 820, a chunk metadata field 825, a chunk field 830 and a recovery area field 835. The header field 820 generally contains metadata information about the master segment, including a size of the segment, a storage location of the segment (e.g., the LUN ID within which the segment is stored) and the volume (ID) to which the segment belongs. The chunk metadata field 825 identifies changes (e.g., allocation or deallocation) to the master segment 810 and the recovery area field 835 logs those changes. However, the chunk field 830 of the master segment 810 is formatted to include a master header sub-field 870 and a block layout sub-field 875 pertaining to the layout of a block (e.g. a HDFS data block).

In some embodiments, a block is a logical construct that resides in volume 805 and includes a collection of chunks. The size of a block can vary, e.g., the block can include one chunk or a substantially large number of chunks. A chunk may be allocated to a block; otherwise, the chunk is freed (e.g., deallocated). The allocation/deallocation information of a chunk is tracked and managed at the data segment level and, thus, is not maintained in the master segment 810.

The chunks stored on a data segment 815 may be chained (linked) together to form blocks of the volume 805; illustratively, the master segment 810 contains block layout information for the blocks contained in its volume. In some embodiments, the chunks stored in the data segment 815 may be organized as blocks and information (metadata) related to the data/chunks of blocks contained within the data segment may be represented as a block layout. Note that the block layout contains a description of the blocks that are stored in a particular data segment 815 of the volume 805, i.e., each data segment 815 has its own block layout. Note further that a block may generally span one data segment (a block generally does not contain chunks from different segments). Thus, the block layout information may be provided per data segment.

In some embodiments, the master header sub-field 870 contains information such as the number of data segments 815 in the volume 805, the number of block layouts for the data segments 815 and the offset at which each block layout starts. The block layout sub-field 875 contains block layout information, including client-specific metadata, for all blocks that are stored within a corresponding data segment 815. Assume a client requests writing of a block; the block layout information may include an identification of the block (block id), the size of the block, client (user) permissions and checksum of the data of the block. In an embodiment, the block layout sub-field 875 may include information (e.g., metadata) that specifies the linking of chunks of a block via pointers to the chunks of the block, as well as a 64-bit block id that uniquely identifies/names the block. The sub field 875 may also contain information as to whether the block is allocated or deallocated and information about the block layout on the segment.

In some embodiments, alignment of the various fields of the master and data segments of a volume may provide substantial improvement to read/write performance of the chunkstore. The fields (e.g., header, chunk metadata, chunk, and recovery area) of the master and data segments are discrete disk locations (e.g., sectors) within the LUNs 860 of the disks. Starting offsets of these fields may be aligned to, e.g., a stripe width across the disks of a RAID group, to ensure that only required information is read/written when accessing a stripe. For example, if the stripe width is a multiple of the disk sector size (e.g., 512 KB), the starting offsets may be multiples of 512K. In particular, the starting offsets of one or more fields of the segments may be aligned with the striped width so that all of the required information from the field(s) may be accessed with, e.g., one read access.

Figure 9:
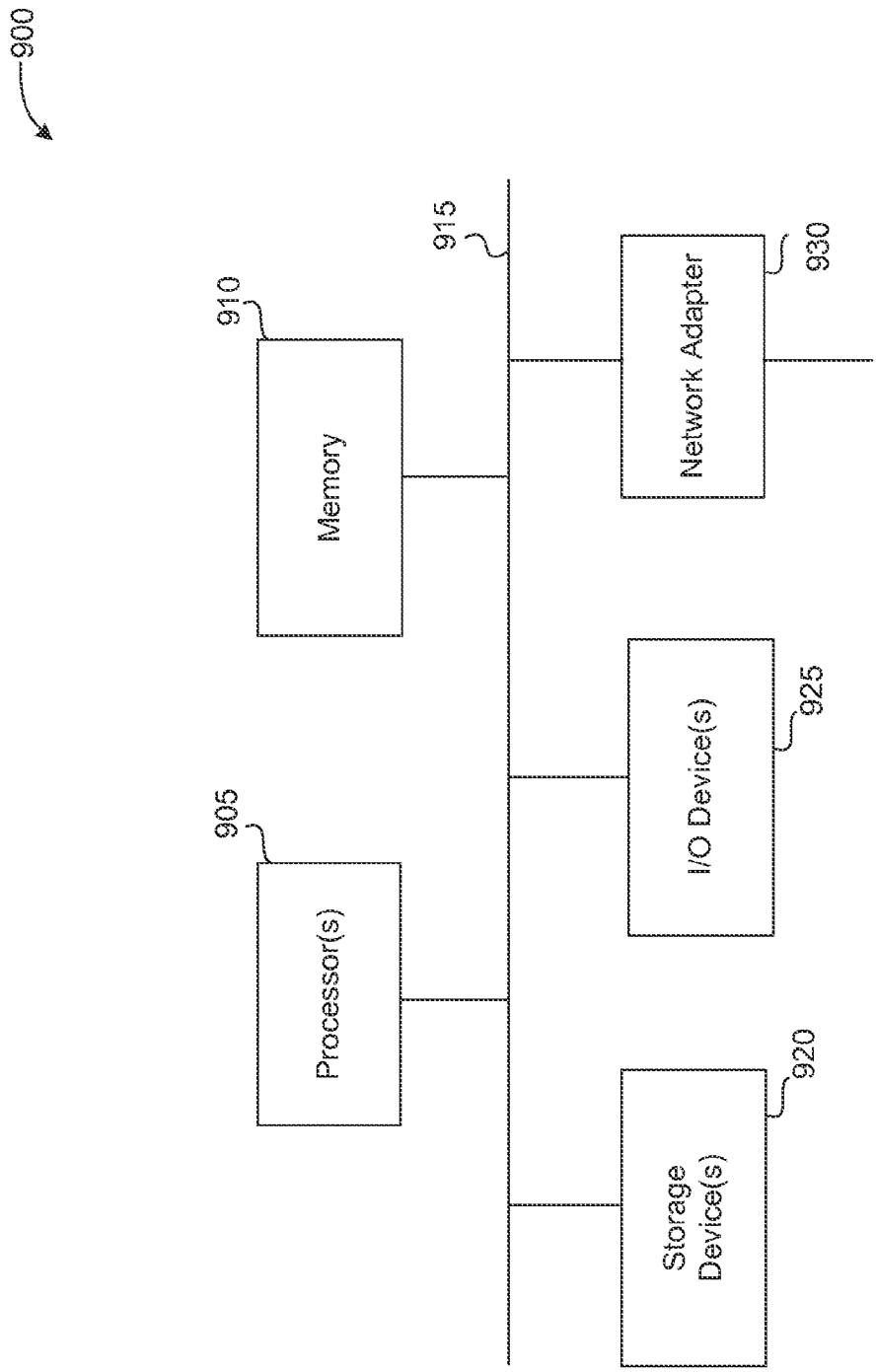
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A method, comprising:
   receiving a request, by a data node server, to access data through a first distributed file system, the request including a first data identifier associated with the data for accessing the data through the first distributed file system; wherein the received first data identifier is used by the data node server to determine that data associated with the first identifier has been evicted from the first distributed file system;
   identifying, utilizing the received first data identifier, a second data identifier associated with the data identified as being evicted from the first file system, the second data identifier being stored within the first distributed file system and utilized for generating a request for accessing the data evicted from the first file system and stored within a second distributed file system;
   retrieving, utilizing the identified second data identifier, the data from within the second distributed file system;
   removing any indication that the data retrieved from the second distributed file system has been evicted from the first distributed file system;
   converting the retrieved data from a first format of the second distributed file system to a second format of the first distributed file system;
   storing, by a gateway manager in the data node server, the converted data within the first distributed file system, wherein the stored data is retrieved from within the first distributed file system in response to another request for the data; and
   providing access to the converted retrieved data through the first distributed file system.

2. The method of claim 1, further comprising:
   receiving a request to store the data within the first file system, the request to store the data including the second data identifier associated with the data;
   storing the second data identifier associated with the data within the first distributed file system; and
   storing information indicative of the data being evicted from the first distributed file system.

3. The method of claim 1, wherein the first distributed file system and the second distributed file system are different types of file systems.

4. The method of claim 3, wherein the first distributed file system is a Hadoop Distributed File System (HDFS), wherein the second distributed file system is a Network File System (NFS).

5. The method of claim 4, wherein the NFS stores the data in the first format, wherein the first format is a file level format and the HDFS stores the data in the second format, wherein the second format is a block level format.

6. The method of claim 5, wherein the first data identifier includes a data block identifier (ID), wherein the second data identifier includes a file pathname.

7. The method of claim 1, wherein the second data identifier includes metadata information that enables the first distributed file system to locate and retrieve the requested data from the second distributed file system.

8. The method of claim 5, wherein the second data identifier stored in the first distributed file system includes one or more sub data identifiers, each of the sub data identifiers corresponding to a portion of the data stored within the second distributed file system.

9. A system, comprising:
   a data node to receive a request to copy data from a first distributed file system to a second distributed file system;
   a gateway client to gather metadata information associated with the data stored within the first distributed file system, the metadata information including information to locate and retrieve the requested data from within the first distributed file system; wherein the gateway client marks data identifiers of data blocks as being evicted when metadata information is stored within the first distributed file system but data associated with the data identifiers is stored at the second distributed file system;
   a gateway manager to:
      store the gathered metadata information in association with a data identifier within the second distributed file system, the data identifier being used to request access to the data via the second distributed file system;
   a chunk store manager to convert the retrieved data from a first format to a second format;
   the gateway manager further to store the converted data within the second file system, wherein the stored data can be retrieved from within the second distributed file system in response to another request for the data; wherein the gateway manager in response to the another request determines that data identifier in the other request is marked as being evicted from the first distributed file system, retrieves metadata information from the first distributed file system; and generates a request for the data using the retrieved metadata information to request the data from the second distributed file system; and the data node further to send a confirmation indicating a completion of the data copy request; wherein the data node stores.

10. The system of claim 9, further comprising:

the data node to receive a request to access the data through the second distributed file system, the request including the data identifier;

the gateway manager to:

utilize the received data identifier to gather the metadata information, associated with the requested data, from within the second distributed file system, and provide access to the retrieved data through the second distributed file system; and the gateway client to utilize the gathered metadata information to retrieve the data from within the first distributed file system.

11. The system of claim 9, wherein the first distributed file system and the second distributed file system are different types of file systems.

12. The system of claim 11, wherein the first distributed file system is a Network File System (NFS), wherein the second distributed file system is a Hadoop Distributed File System (HDFS).

13. The system of claim 12, wherein the data identifier includes a data block identifier (ID), wherein the metadata information include a file pathname.

14. A non-transitory computer readable storage medium storing computer executable instructions, comprising:

instructions for receiving a request to access data through a first distributed file system, the request including a first data identifier associated with the data for accessing the data through the first distributed file system; wherein the received first data identifier is used by the data node server to determine that data associated with the first identifier has been evicted from the first distributed file system;

instructions for identifying, utilizing the received first data identifier, a second data identifier associated with the data identified as being evicted from the first file system, the second data identifier being stored within the first distributed file system and utilized for generating a request for accessing the data evicted from the first file system and stored within a second distributed file system;

instructions for retrieving, utilizing the identified second data identifier, the data from within the second distributed file system;

instructions for removing any indication that the data retrieved from the second distributed file system has been evicted from the first distributed file system;

instructions for converting the retrieved data from a first format of the second distributed file system to a second format of the first distributed file system;

instructions for storing the converted data within the first distributed file system, wherein the stored data can be retrieved from within the first distributed file system in response to another request for the data; and instructions for providing access to the converted data through the first distributed file system.

15. The non-transitory computer readable storage medium of claim 14, further comprising:

instructions for receiving a request to store the data within the first distributed file system, the request to store the data including the second data identifier associated with the data;

instructions for storing the second data identifier associated with the data within the first distributed file system; and instructions for storing information indicative of the data being evicted from the first distributed file system.

16. The non-transitory computer readable storage medium of claim 14, wherein the first distributed file system and the second distributed file system are different types of file systems.

17. The non-transitory computer readable storage medium of claim 16, wherein the first distributed file system is a Hadoop Distributed File System (HDFS), wherein the second distributed file system is a Network File System (NFS).

18. The non-transitory computer readable storage medium of claim 17, wherein the NFS stores the data in the first format, wherein the first format is a file level format, and the HDFS stores the data in the second format, wherein the second format is a block level format.

19. The non-transitory computer readable storage medium of claim 14, wherein the first data identifier includes a data block identifier (ID), wherein the second data identifier includes a file pathname.

20. The non-transitory computer readable storage medium of claim 14, wherein the second data identifier includes metadata information that enables the first distributed file system to locate and retrieve the requested data from the second distributed file system.

* * * * *